Aug. 9, 1932.  J. V. GIESLER  1,870,903
DISPENSING TUBE
Filed Dec. 15, 1928
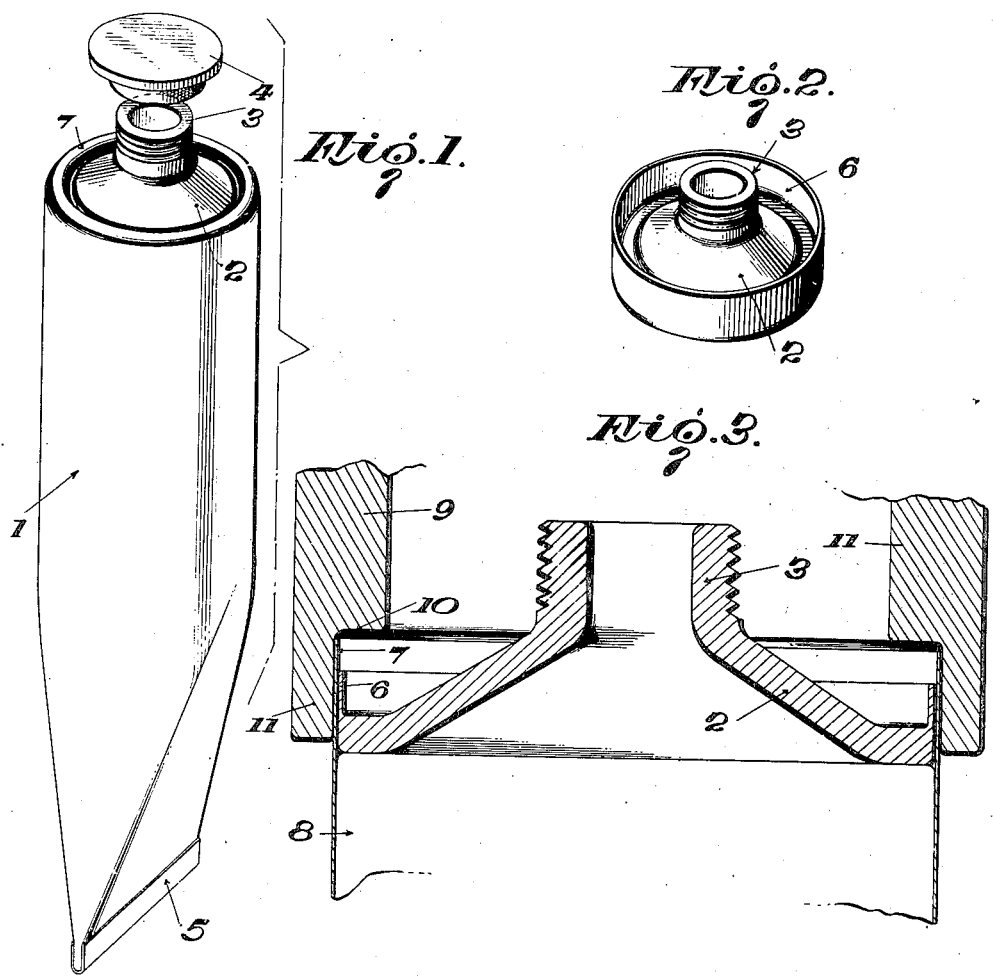
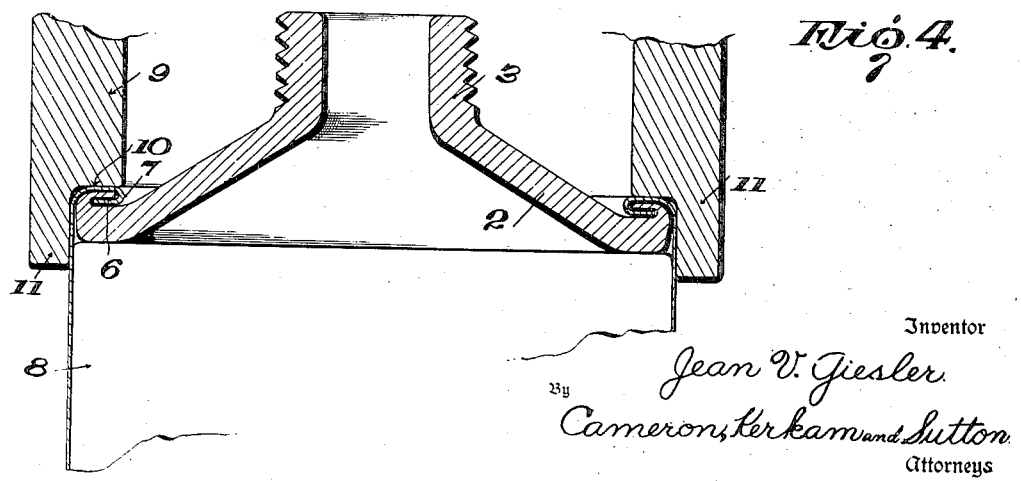
Inventor
Jean V. Giesler
By Cameron, Kerkam and Sutton
Attorneys Patented Aug. 9, 1932

1,870,903

UNITED STATES PATENT OFFICE

JEAN V. GIESLER, OF KNOXVILLE, TENNESSEE, ASSIGNOR TO THE FULTON SYLPHON COMPANY, OF KNOXVILLE, TENNESSEE, A CORPORATION OF DELAWARE

DISPENSING TUBE

Application filed December 15, 1928. Serial No. 326,170.

This invention relates to dispensing tubes for substances such as paste, glue, and the like, and to a method for the manufacture thereof.

Tubes of this character, as is well known in the art, comprise a thin-walled tube of flexible material which can be squeezed to expel the paste, etc., said tubes having at one end a comparatively thick, rigid end wall or head having a dispensing opening, which head affords the desired strength and rigidity for the finished tube.

One manner in which such tubes may be manufactured is by bending the peripheral portion of the head radially inward back on itself, the inner portion of the thin-walled tube being also bent radially inward, following the bent portion of the head, and being curled under said bent portion to form a lock seam. It has been found, however, that when the thin-walled tube and the comparatively thick head are passed through dies or like apparatus adapted to carry out this curling or seaming operation, the thin-walled tube is often pinched or cut off, with much wastage of material, time and labor.

One of the objects of this invention is to provide a novel form of paste tube having an improved lock seam of the type described above. Another object is to provide a novel method for manufacturing such a tube whereby the above disadvantages are obviated, losses due to breakage and cutting off of the tube during manufacture are reduced, and a satisfactory finished product is obtained with a minimum of labor and material cost. Other objects will appear hereinafter as the description of the invention proceeds.

One manner of practicing this method and one embodiment of the finished tube are illustrated in the accompanying drawing, but it is to be expressly understood that said drawing is for purposes of illustration only and are not to be construed as a definition of the limits of the invention, reference being had to the appended claims for this purpose.

In said drawing,—

Fig. 1 shows a finished tube embodying the invention;

Fig. 2 is a perspective view of a tube head ready for assembly with the tube wall; and Figs. 3 and 4 illustrate successive steps in the manufacture of the tube shown in Fig. 1.

Referring now to the drawing, wherein like reference characters indicate like parts throughout the several views, the finished paste tube as shown in Fig. 1 comprises a thin-walled flexible tubular body 1, provided at one end with a comparatively thick and rigid disk-like head 2 which is preferably conical at its central portion and is provided with a threaded nipple 3 with which cooperates a cap 4. After filling, the other end of the tubular wall 1 is flattened out and clamped together at 5 in any suitable manner.

The joint between the tubular wall 1 and the head 2 is formed by a lock seam such as shown more clearly in Fig. 4. In forming this joint, the head 2 is first formed as shown in Figs. 2 and 3, being provided around its periphery with a tubular flange 6, extending perpendicularly to the general plane of the disk 2. While the head 2 must be comparatively thick and rigid, in order to impart sufficient strength to the finished tube, the tubular flange 6 is made much thinner so as to be easily bent, being comparable in flexibility to the wall 1.

The head 2 is then inserted in one end of the wall 1 far enough so that the end portion 7 of said wall extends beyond the end of the tubular flange 6, as shown in Fig. 3. The parts assembled in this relative position may be joined by means of suitable die apparatus, which as shown comprises a punch or support 8 which is inserted within the tube 1 and supports the head 2, and a tubular die 9 having a central opening large enough to surround the conical portion of the disk 2, said die being recessed at its end to provide a suitably curved shoulder 10 and an extending end portioin 11 of greater inner diameter which is adapted to fit outside the tube 1.

With the parts in the position shown in Fig. 3, the die 9 is advanced, and the curved surface of the shoulder 10 therein engages the end of the wall 1 and curls the end of said wall inward and downward over the flange 6. As the die 9 is still further advanced, the curved surface of shoulder 10 bends the flange 6 and folds the latter down onto the disk 2 with the end of the wall curled around and under the flange. The final position of the die is shown in Fig. 4, wherein the flange 6 has been bent down and the lock seam has been completely formed. The joint is now completed and the tube is ready for filling and closing as above described.

The provision of the thin readily bendable flange portion on the disk head of the tube renders it possible to form the lock seam more easily, and reduces the chances of damage to the end portion of tube 1. This is because the flange bends easily into shape during the seaming or curling operation without danger of pinching or cutting off the tubular wall 1, whereas if it is attempted to form the lock seam in one operation with metal of the rigidity required for the head of the finished tube, damage to said tubular portion is likely to result. By making the head separate from the tube, the latter may be economically manufactured and cut to the desired size, while the size, shape and form of the head may be made as desired.

While only one embodiment of the finished tube and only one manner of carrying out the method of manufacture thereof have been described and illustrated in the drawing, it will be apparent to those skilled in the art that the same are capable of a variety of mechanical expressions and that changes may be made in the form, proportion, and arrangement of the parts as well as in the procedure followed in manufacturing the tube, without departing from the spirit of the invention. Reference is therefore to be had to the appended claims for a definition of the limits of the invention.

What is claimed is:

1. A dispensing tube for paste and like substances comprising a thin flexible tubular wall and a comparatively thick disk-like end wall or head therefor, said head having a peripheral flange integral therewith and thinner than the material of said head, said flange being bent back onto said head, and the end portion of said tubular wall extending around and under said flange with the end thereof clamped between said flange and head to form a tight seal.

2. A dispensing tube for paste and like substances comprising a thin flexible tubular wall and a comparatively thick disk-like end wall or head therefor, said head having a flange integral therewith and thinner than the material of said head, said flange and tubular wall being interlocked to form a seam inside of the periphery of said tubular wall.

3. A dispensing tube for paste and like substances comprising a rigid head having a flexible peripheral flange integral therewith and a tube of thin flexible material having one of its ends interlocked with said flange within the periphery of said head, said flange being bent inwardly onto said head and said tube end being gripped between said flange and said head.

In testimony whereof I have signed this specification.

JEAN V. GIESLER.